United States Patent Office 3,486,093
Patented Dec. 23, 1969

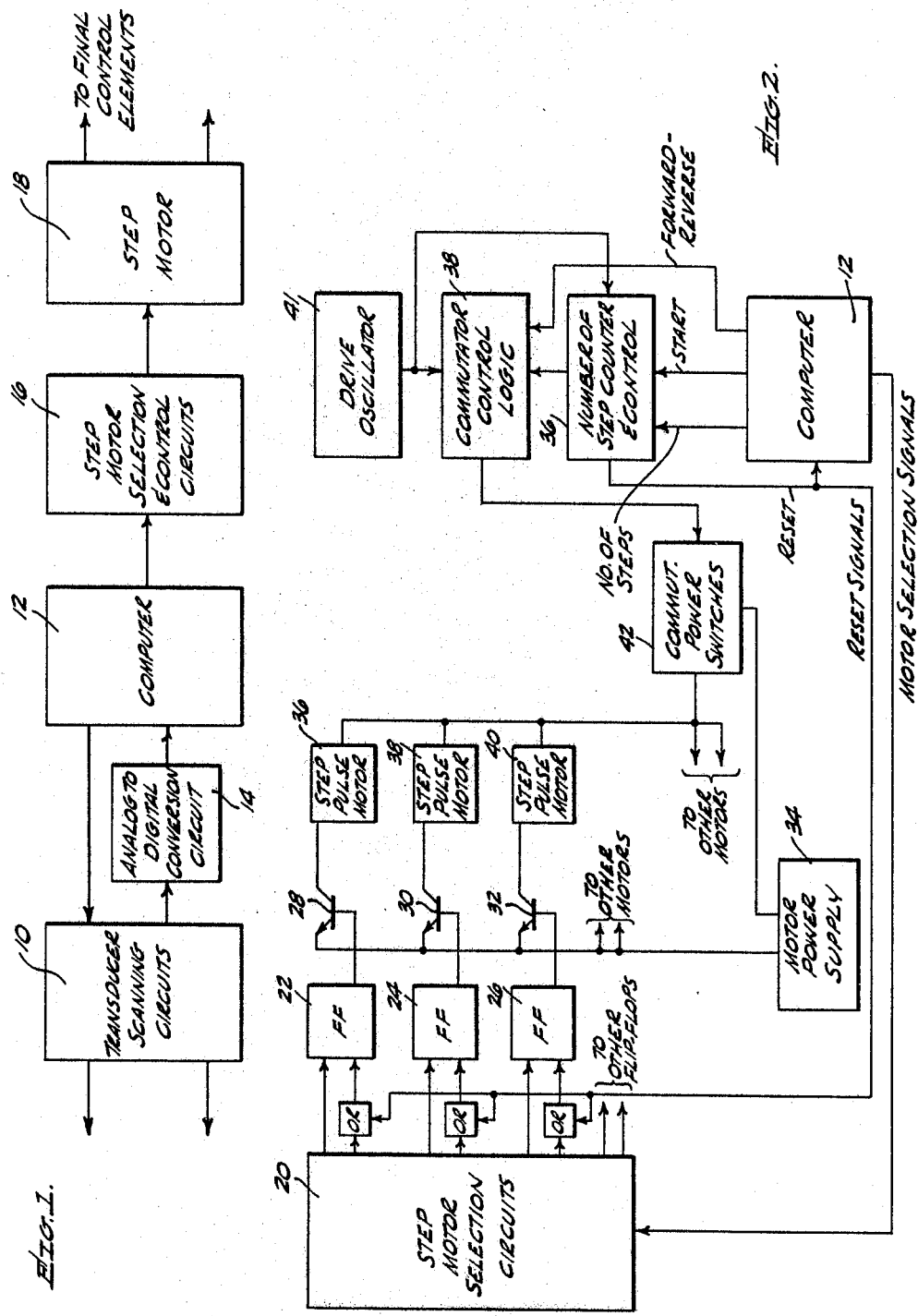

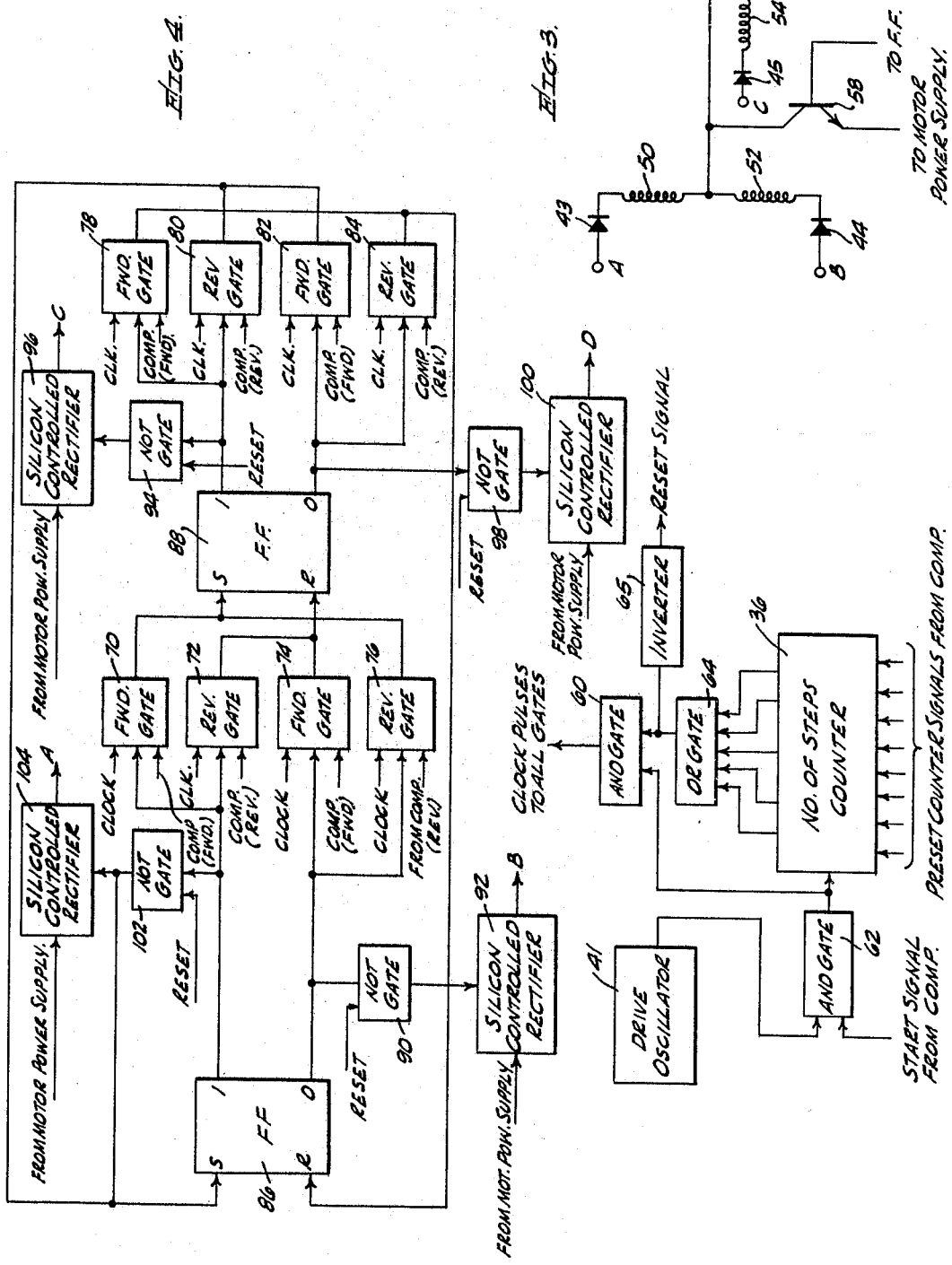

3,486,093
MOTOR CONTROL IN A PROCESS CONTROL SYSTEM
Donald B. McArthur, Los Angeles, Calif., assignor to Hughes Aircraft Company, Culver City, Calif., a corporation of Delaware
Filed Jan. 17, 1966, Ser. No. 521,070
Int. Cl. H02p 1/56
U.S. Cl. 318—102                                   7 Claims

ABSTRACT OF THE DISCLOSURE

A direct digital control for the motors of a process control or other industrial control in which all of the motors are driven simultaneously at the same speed during each drive interval. The drive interval is determined by a digital computer as a predetermined count. The motors to be driven in any particular drive interval are selected by the computer.

---

This invention relates to apparatus for controlling motors employed in a process control system, and more particularly to improvements therein.

The automatic control of industrial processes by computers has by now become well established. At an automatic control installation signals are transmitted to a central computer from various locations in the plant where the process is being controlled. These signals represent what is occurring in the process being controlled at the location at which these signals are generated. The computer performs whatever operations are required on the data represented by these signals and then sends out control signals to apparatus which responds thereto to either alter the process or maintain it, depending upon the instructions from the computer.

Where the control operation requires the operation of valves or other similar mechanical equipment, motors are employed of a type generally called "stepping motors" which rotate an increment of a complete cycle at a time. The length of arc of these increments may be anywhere up to 200 for a complete revolution. Accordingly, these motors provide a rather precise mechanism which can be precisely controlled by the computer to operate a valve or other apparatus.

In controlling these stepping motors, the computer functions to determine how many steps the stepping motor is required to take in order to adjust the apparatus being controlled by it to a desired position. The motor, or motors, if a multiple operation is required, is then driven at a speed which varies with the number of steps required. Essentially, with present operations a velocity pattern is established for a corrective condition which is applied to a motor. Alternatively expressed, a computer employed for process control will store a number of predetermined velocity patterns which are applied to the various motors being controlled in order to achieve a desired control effect within a certain interval. In order to drive a plurality of motors at different velocity patterns there is required a separate power supply and/or power commutator for each motor to be driven, and in addition, different velocity pattern memory flip-flops and their associated selection gates are required for each motor in the velocity scheme.

Accordingly, an object of this invention is the provision of a novel motor control arrangement in a process control system.

Yet another object of the present invention is the provision of a simplified motor control arrangement in a process control system.

Still another object of the present invention is the provision of a motor control arrangement in a process control system which is more economical than those employed heretofore.

These and other objects of the invention briefly, are achieved by driving all motors at a single most efficient speed but, however, controlling the number of steps through which each motor is driven in accordance with the information supplied by the computer. Since, in most closed loop applications, motor position may be purely incremental as determined by measurement of the dependent process control variables the computed incremental position change commanded may be stored in the computer memory in lieu of actual motor position; thus, essentially no increase in storage within the computer is required. Since all the motors are driven at the same speed, a single commutated power supply may be employed for all motors instead of a different power supply for each different velocity of motor drive.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a simplified block diagram of a process control computer arrangement;

FIGURE 2 is a schematic block diagram of a step motor control arrangement in accordance with this invention;

FIGURE 3 is a schematic diagram of bifilar step pulse motor which is controlled in accordance with this invention; and FIGURE 4 is a schematic block diagram showing in more detail the motor drive arrangement which is represented in FIGURE 2.

Referring now to FIGURE 1 of the drawings, there may be seen a simplified block diagram of a process control arrangement exemplifying the environment wherein the embodiment of the invention may be employed. Assume, for example, that the process being controlled is a chemical process wherein a plurality of control valves or elements such as potentiometers, spaced at various positions over the area over which the process is being effectuated, are controlled to, in turn, control the flow of fluids or gases in the process. The condition at each of the steps of the process which is to be controlled is usually detected by some type of sensing element and a transducer converts the sensing element output to a representative electrical signal. Thus, since the process being controlled normally has a plurality of transducers, these are scanned by some type of transducer scanning circuits 10, whose rate of scanning as well as rate of repetition is determined by the controlling computer 12. The output of each one of the transducers which is scanned by the scanning circuit is usually applied to some analog-to-digital conversion circuit 14, the output of which is fed to the computer 12.

The computer then proceeds to process the incoming data. As a result of the processing, the computer will issue instructions to the motors which control the final control elements employed in the process. The computer will issue one instruction which selects which of the motors are to be operated and then a second instruction which indicates the extent of such operation. A rectangle 16 which is designated as step motor selection and control circuits respond to these instructions to control the step motors 18 in accordance therewith.

It will be appreciated that the explanation of the process control arrangement is a considerably simplified one. It is given, however, for the purpose of orientation within the environment in which this invention is employed, rather than for the purpose of providing details of a process control computer arrangement. There is a considerable amount of literature published, both in the form of patents as well as magazines and books which describe, in detail, process control systems and computers used in them.

FIGURE 2 is a schematic arrangement illustrating a step pulse motor control system in accordance with this invention. These step pulse motors are commercially purchasable motors, sold, for example, by the Superior Electric Company of Bristol, Connecticut, under the trademark "Slo-Syn" motor. The computer 12 provides motor selection signals to step motor selection circuits 20. This may merely comprise a converter which converts the digital ouput signals of a computer into a signal on one out of many (or a plurality out of many) lines. These lines are connected to flip-flop circuits 22, 24, 26, which are driven from their reset to their set conditions by the presence of this signal. Three flip-flops are shown by way of example. There are as many flip-flops as there are step pulse motors to be controlled.

Each one of the flip-flops 22, 24, 26, when driven to its set condition, enables an associated power transistor 28, 30, 32 to apply power from one side of a motor power supply source 34, to each one of the associated motors 36, 38, 40. It will be seen that the "one," or "set" output of the flip-flops are respectively connected to control the power transistors 28, 30, 32. The motor power supply 34 is connected to the emitters of these respective power transistors and each one of the step pulse motors respectively 36, 38, 40 is connected to the collector of each one of the power transistors. Thus, selection of the step pulse motors, which it is desired to operate, is effectuated by selectively connecting one side of the motor power supply to the selected step pulse motors.

The computer 12 indicates, to a number of steps counter and control circuitry 36, the number of steps desired for the plurality of selected motors. The computer also indicates to circuitry designated as commutator control logic 38, the direction in which the step pulse motors selected should operate. A drive oscillator 41 applies clock pulses to both the commutator control logic circuitry 38 and the number of steps counter and control circuitry 36. The number of steps counters are driven by the oscillator to count out the number of steps established by the computer. In response to the clock pulses of the drive oscillator 41 and the output from the number of steps counter, the commutator control logic sequences the commutator power switches 42 to apply drive pulses from the motor power supply to all of the step pulse motors, since all of them are connected to the commutator power switches 42. However, only those of the motors will be driven for which the circuit to the motor power supply has been completed by the operation of the step motor selection circuits.

In summarization of the arrangement described, the step motor selection circuit, under instructions from the computer 12, provides signals for connecting one side of the motor power supply 34 to the selected step pulse motors. The computer then provides signals indicative of the number of steps these step pulse motors should be advanced and the direction of rotation. Means are provided for controlling the number of motor drive pulse sequences supplied to the other sides (connected in common) of the selected pulse motors to advance them in the direction indicated. The number of steps counter 36, at the termination of the number of pulses indicated to be applied by the computer, signals the computer to that effect and also resets the flip-flops which were selected by the step motor selection circuit, thereby disconnecting the selected motors from the other side of the power supply, and in addition, stops the operation of the commutator control so that no further pulses are supplied on the common motor terminals.

While from the preceding explanation it would appear that all the step pulse motors which are connected to be driven by the commutator control logic are driven until the number of steps counter has completed its count, this need not necessarily be so since the mode of driving the motors may be to connect them all to be driven at the time that the counter first starts counting and thereafter, by the simple medium of storing the desired number of counts during which each motor is to be driven, when the count for any particular motor or group of motors is achieved, the computer can drop out that motor or group of motors by resetting any one of the flip-flops 22, 24, 26. The count can then continue and the motors which are to be driven further will continue to be driven.

Another mode of operation can be to establish incremental counts such that a first small increment is one during which all motors to be driven, regardless of the number of steps, are connected in. At the end of this increment, those motors which are not to be driven any further are omitted but the other motors which are to be driven further than the ones which have been cut out are connected in and driven for another and larger increment. In this manner, succeeding larger drive increments may be employed so that motors which are driven during the last increments are those whose desired rotation is the rotation which occurs as a result of the sum of all the increments. In the event there is an overshoot of motors, using this system, then the succeeding drive interval can be one wherein motors are reversed by successively larger increments. Exact step control of the motors may be achieved by arranging successive drive pulse increments in an increasing (or decreasing) purely binary fashion. The motors may then be selectively connected to be driven during selected ones of their drive pulse increments to achieve a correct incremental displacement.

While any one of the available step motors may be employed with the embodiment of the invention, it is preferred to use motors known as bifilar synchronous motors for this purpose. The motor has a permanent magnet or armature, and has two field windings. However, half of each field winding is wound on the other half and in the opposite direction so that the motor can be stepped by switching from one half of the winding to the other half rather than by changing the polarity of the current being applied. The commutation sequence for rotating the motor in the clockwise or counterclockwise direction is shown in Table No. 1. As may be seen in FIGURE 3, the input terminals to the bifilar windings are designated by A, B, C and D. Diodes 43, 44, 45 and 46 are connected between the terminals A, B, D, C, and one end of the respective bifilar windings 50, 52, 54, 56 to prevent unwanted operation of unselected motors through sneak current paths. The ones or zeroes in the table underneath each one of the letters which heads the column designates whether or not a current pulse is applied to that terminal.

TABLE NO. 1

|  | A | B | C | D |
|---|---|---|---|---|
| FORWARD=1 | 1 | 0 | 1 | 0 |
| 2 | 0 | 1 | 1 | 0 |
| 3 | 0 | 1 | 0 | 1 |
| 4 | 1 | 0 | 0 | 1 |
|  | 1 | 0 | 1 | 0 |
| REVERSE=1 | 1 | 0 | 0 | 1 |
| 2 | 0 | 1 | 0 | 1 |
| 3 | 0 | 1 | 1 | 0 |
| 4 | 1 | 0 | 1 | 0 |

The bifilar windings respectively 50, 52, 54, 56 are connected together and the ends are joined and connected to the other terminal of a suitable power supply. Thus, in the present situation, the connected together ends of the windings are connected to a power transistor 58, representative of one of the transistors 28, 30, 32, of FIGURE 2. The other input terminals to the respective windings 50, 52, 54, 56 are designated by the letters A, B, C, D, as previously indicated, corresponding to the letters shown in the table and to which connections are made from the other terminal of the motor power supply in a sequence determined by the commutator control logic 38 (FIGURE 2).

FIGURE 4 is a schematic block diagram illustrating some details of the commutator control logic 38 and commutator switches 42 shown in FIGURE 2. The computer 12 (FIGURE 2) provides an output to the number of steps counter 36 consisting of signals which preset the counter to a count condition representative of the total number of steps to be performed by the one or more motors which have been selected by the step motor selection circuits. The oscillator 41 continuously provides output pulses to an And gate 62. After the number of steps counter has been preset by the computer, a start signal is applied by the computer to the And gate 62. This opens or enables the And gate 62 and permits the pulses from the oscillator 41 to be applied to the counter 36 and to And gate 60. And gate 60 is enabled in the presence of a count output from the counter (other than zero) to provide the oscillator output as clock pulses to the remaining circuitry to be described. The counter in response to pulses from oscillator 41 proceeds to count backwards from its preset count condition toward zero. Upon achieving its zero count condition, it provides an output which comprises the reset signal which is both applied to the computer signaling the termination of the count and also to reset all the flip-flops 22, 24, 26 (FIGURE 2) whereby the step pulse motors are disconnected from the power supply and also to the Not gates 90, 94, 98, 102 (FIGURE 4) such that the commutating silicon controlled rectifier switches 92, 96, 100, 104 are held turned off so that no drive power is supplied from the common power lines to the plurality of motors thereto connected, thus allowing selection of motors for the next drive increment programmed by the computer.

All of the count outputs of the number of steps counter 36 are collected by an Or gate 64, the output of which enables And gate 60 to pass the clock pulses from the oscillator 41 via And gate 62 to the respective And gates 70, 72, 74, 76, 78, 80, 82 and 84. The purpose of these gates is to properly drive the two flip-flops 86, 88, upon the arrival of a clock pulse, in a manner so that they provide a proper sequence of outputs for driving the step motors forward, or backward, in accordance with the instruction received from the computer. The sequence of outputs are shown in Table No. 1. These flip-flop outputs are supplied via Not gates 90, 94, 98, 102 to the silicon controlled rectifiers 92, 96, 100, 104 which connect the common power supply selectively to the respective terminals A, B, C, D of the step pulse motors. The silicon rectifier switches 92, 96, 100, 104 are incorporated in the block 42 of FIGURE 2.

An inverter 65 is connected to the output of Or gate 64. The inverter provides an output comprising a reset signal where there is no output of the Or gate 64, which occurs when counter 36 reaches zero. The reset signal is applied to the computer to signal the termination of the count, and also to the flip-flops 22, 24, 26 (FIGURE 2) to reset them, thereby disconnecting the motors from the power supply. The reset signal is also applied to Not gates 90, 94, 98, 102 (FIGURE 4) to inhibit them such that the commutating silicon controlled rectifier switches 92, 96, 100, 104 are held turned off for the purpose described hereinbefore.

For the illustrative bifilar type step motor, a sequence of four inputs are required for a forward or a backward step. The computer is cognizant of this and thus one way to handle this problem is to make the number, to which the number of steps counter is preset, four times greater than the actual number of steps required. Since the number of steps counter is advanced one count for each clock pulse output of the oscillator 41, and since four clock pulses are required to drive the two flip-flops 86, 88 through a four step sequence required for advancing the motor one increment, the increase by four in the count preset in the counter provides the correct interval for driving the motors.

The first output pulse of the oscillator 41, after the start signal has been provided to And gate 62 (FIGURE 4), thus allowing clock pulses to occur at its output, causes the number of steps counter 36 to advance to its first count. Assume that the flip-flops 86 and 88 are initially in the states with their one outputs high, since, as will be shown hereafter, this is the state at which they are left at the termination of any count. The first clock pulse received from the And gate 60 is applied to all the enabled forward gates 70, 74, 78 and 82. However, only forward gates 70 and 78 have all three of the required inputs present. Since flip-flop 88 is already in the set state to which it is being driven by the output of the forward gate 70, flip-flop 86 will be driven to its reset state in response to the output of forward gate 78. Accordingly, after the first clock pulse the zero and one states of flip-flops 86, 88 are high.

The zero or reset output of flip-flop 86 is applied to a gate 90 designated as a Not gate, since this gate is not able to pass a signal from the reset output of the flip-flop 86 in the presence of a reset signal obtained when the counter 36 is in its zero state. It is only when this reset signal is not present that Not gate 90 is enabled. Since the inverter 65 is now no longer providing a reset signal output the reset output of the flip-flop 86 is permitted to pass through a Not gate 90 to enable a silicon controlled rectifier 92 to apply a current pulse from the motor power supply 34. The output of the silicon controlled rectifier 92 is labeled B to indicate that it connects to all of the B terminals of all of the bifilar wound motors, used in the control system.

Since flip-flop 88 remains with its one, or set output, high, and since the Not gate 94 connected to this reset output is also now enabled, the silicon controlled rectifier 96 is now enabled to apply a pulse from the motor power supply to the terminal C of all of the bifilar type step motors used in the system. It will be seen that after the first clock pulse the first condition for advancing the motor is achieved. The amount of current permitted to be applied to the motor through the silicon controlled rectifier is established to provide the optimum operation under the conditions of control.

Upon the application of a second clock pulse from the And gate 60, the output of Or gate 74 drives flip-flop 88 to its reset state while flip-flop 86 remains in its reset state. The Not gate 98 can then permit the silicon controlled rectifier 100 to be enabled to the reset output on flip-flop 88 whereby terminal D of all of the stepper motors are made high. It should now be apparent that terminals B and D of the motors now have current applied as called for by step 2 in the table.

Upon the occurrence of the next clock pulse, in order for a step motor to properly advance, terminals A and B of the motor must have current applied thereto. Flip-flop 88 remains in its reset state since between forward gate 70 and 74, only gate 74 has all of its inputs present and flip-flop 86 is driven to its set state since forward gate 82 has all of its required inputs upon the occurrence of the clock pulse. This will enable the Not gate 102 to apply the set output of flip-flop 86 to the silicon controlled rectifier 104. The output of the silicon controlled rectifier 104 is connected to all of the terminals A of all of the step motors controlled in the system. Terminals D of all of the step motors still receive current from the silicon controlled rectifier.

It will be noted that terminals A and D of all of the step motors now have current applied thereto which is the requirement for the third step of the forward rotation sequence of the motors.

Upon the arrival of the next clock pulse, flip-flop 86 remains with its set output high but flip-flop 88 is driven from forward gate 70 whereby the terminals C of all of the motors receive an input. This is the condition called for in the fourth step of the sequence, it will be noted that this step is identical with the initial step called for in the table. Thus, the next clock pulse which is received initiates another cycle of the commutaton sequence. When the counter has counted down to zero, flip-flops 86 and 88 are left in their set states. No further clock pulses can pass through And gate 60, nor can any further clock pulses pass through And gate 62 since the start signal from the computer is withdrawn at this time.

If the computer instructs the commutator control logic to cause the step motors to reverse, then all of the reverse gates have a reverse signal applied to them from the computer so that upon receiving their other two inputs, they can cause the two flip-flops to sequence in a manner to produce the reverse outputs called for in the table. Thus, upon the occurrence of the first clock pulse upon the initiation of a reverse sequence, reverse gate 72 is enabled to drive flip-flop 88 to its reset state whereby the D terminals of the motors will receive current as well as the A terminals of the motors. It is believed that the sequencing of the two flip-flops in response to clock pulses for producing the reverse energization sequences for the motor should be obvious from the foregoing explanation and thus further explanation is not required here.

From the foregoing description it will be apparent that a novel and unique arrangement for controlling step pulse motors has been described wherein the speed at which the motor advances or reverses is fixed at the optimum speed to achieve best motor operation. The duration of said motor operation is simply controlled by establishing a drive interval as a number of counts on a counter driven by clock pulses. A saving in the basic hardware for carrying out the operations of the step motors is achieved since a single power supply and commutating system can handle all of the motors. This also permits a simplification and minimization of the manual back up equipment normally employed with the automatic motor control equipment.

What is claimed is:

1. An electrical control apparatus comprising a plurality of motors of the type which operate in increments in response to pulses, each of said motors having a first input terminal and a plurality of second input terminals whereby a motor may be caused to operate incrementally by the application of successive pulses applied between said first input terminal and successive ones of said second input terminals, a source of power for operating said motors, selective means for selectively coupling first terminals of the ones of said motors which it is desired to operate to said source of power, commutator means operative for coupling said second terminals of all of said motors to said source of power in a predetermined sequence for enabling those motors having first terminals connected to said source of power to operate incrementally, and counter means for operating said commutator means while counting over a predetermined interval.

2. An electrical control apparatus as recited in claim 1 wherein said selective means comprises a first switch means for each of said first input terminals, said commutator means includes a plurality of second switch means, one of said second switch means coupling when operative like ones of the second input terminals of all of said motors to said source of power, flip-flop means operative when driven to render said second switch means operative in a predetermined sequence, means to drive said flip-flop means responsive to said counter means, and means responsive to said counter means terminating its count over a predetermined interval to render all of said first switch means inoperative.

3. In a control system for controlling a plurality of motors, the combination comprising:
   means for cyclically producing individual motor selection signals and for producing a motor control signal for all selected motors in a particular cycle of motor selection signals;
   a source of electric power;
   respective electric power circuits each having connections to said motors and to said source of electric power;
   motor selection switching means coupled in each of said electric power circuits and responsive to said motor selection signals for providing for the connection of selected motors to said electric power source; and
   circuit means, including electrical switching means coupled in each electric power circuit, responsive to said motor control signal for simultaneously switching said electric power circuits to simultaneously similarly control all of said selected motors.

4. In a control for a plurality of motors, the combination comprising:
   means for cyclically producing motor selection signals respectively indicating individual ones of said motors to be controlled;
   means for producing a motor control signal, during individual cycles of said motor selection signals, indicative of an operation to be performed by all selected motors;
   means responsive to said motor selection signals and coupled to said motors for establishing energizing circuits for selected motors; and
   means responsive to said motor control signals and coupled to said motors for simultaneously, similarly controlling all of said selected motors.

5. Apparatus as set forth in claim 4 in which said means responsive to said motor selection signals comprises:
   a power switching device coupled to each motor;
   individual control devices coupled to each power switching device for controlling each said power switching device; and
   motor selection circuits coupled to said individual control devices and to said means for cyclically producing motor selection signals and responsive to said motor selection signals, for controlling said individual control devices.

6. Apparatus as set forth in claim 4 in which said means responsive to said motor control signals comprises:
   a digital counter for providing a count indicative of said motor control signals;
   control circuits including power switching means connected to all of said motors to control the application of electric power to each connected motor; and
   electric pulse producing circuit means coupled to and controlled by said counter and having an electrical output coupled to said control circuits for operating said power switching means.

7. Apparatus as set forth in claim 6 in which said electric pulse producing circuit means comprises:
   oscillator means coupled to said digital counter for driving said digital counter; and
   gating means coupled to said digital counter and to said oscillator means and controlled thereby and having an electrical output circuit coupled to said control circuits for operating said power switching means.

(References on following page)

References Cited

UNITED STATES PATENTS

| | | |
|---|---|---|
| 3,015,806 | 2/1962 | Wang et al. |
| 3,122,691 | 2/1964 | Centner et al. |
| 3,211,976 | 10/1965 | Brule et al. |
| 3,218,532 | 11/1965 | Toscano. |
| 3,241,017 | 3/1966 | Madsen et al. _____ 318—138 |
| 3,348,108 | 10/1967 | D'Onofrio _____ 318—18 XR |
| 3,353,161 | 11/1967 | Toscano. |
| 2,918,951 | 12/1959 | Haumann _____ 318—103 |
| 3,064,173 | 11/1962 | Breen et al. _____ 318—85 XR |

ORIS L. RADER, Primary Examiner

G. R. SIMMONS, Assistant Examiner

U.S. Cl. X.R.

318—103, 138, 447